United States Patent
Hsiao

(10) Patent No.: US 8,253,860 B2
(45) Date of Patent: Aug. 28, 2012

(54) SYSTEM, METHOD AND DEVICES FOR HDMI TRANSMISSION USING A COMMONLY SUPPORTED MEDIA FORMAT

(75) Inventor: Chih-Hao Hsiao, Taipei (TW)

(73) Assignee: MediaTek Inc., Hsin-Chu (TW)

( * ) Notice: Subject to any disclaimer, the term of this patent is extended or adjusted under 35 U.S.C. 154(b) by 1178 days.

(21) Appl. No.: 12/098,484

(22) Filed: Apr. 7, 2008

(65) Prior Publication Data

US 2009/0251605 A1    Oct. 8, 2009

(51) Int. Cl.
 H04N 3/27    (2006.01)
 H04N 5/765    (2006.01)
 H04N 11/02    (2006.01)
 G06F 13/12    (2006.01)
 G06F 11/30    (2006.01)
 H04K 1/00    (2006.01)

(52) U.S. Cl. .......... 348/554; 386/231; 710/62; 380/270; 713/189; 375/240.01

(58) Field of Classification Search .......... 348/554; 386/231; 710/62; 380/270; 713/189; 375/240.01
See application file for complete search history.

(56) References Cited

U.S. PATENT DOCUMENTS

| | | | | |
|---|---|---|---|---|
| 2006/0280055 A1* | 12/2006 | Miller et al. | | 369/44.11 |
| 2007/0006269 A1* | 1/2007 | Huang et al. | | 725/81 |
| 2007/0280646 A1* | 12/2007 | Seita et al. | | 386/96 |
| 2008/0080596 A1* | 4/2008 | Inoue et al. | | 375/211 |
| 2008/0148063 A1* | 6/2008 | Hanko et al. | | 713/189 |
| 2008/0232588 A1* | 9/2008 | Christison | | 380/270 |
| 2009/0089842 A1* | 4/2009 | Perry et al. | | 725/78 |
| 2009/0156051 A1* | 6/2009 | Doyle et al. | | 439/489 |

FOREIGN PATENT DOCUMENTS

WO    WO 2008/030562    3/2008

OTHER PUBLICATIONS

Dr. Rajeev Krisnamoorthy, High Definition, Anywhere: How Ultra Wideband Makes Wireless HDMI Possible, 2007, IEEE.*

* cited by examiner

Primary Examiner — Hoang-Vu A Nguyen-Ba
(74) Attorney, Agent, or Firm — Thomas|Kayden

(57) ABSTRACT

A High Definition Multimedia Interface (HDMI) system is provided. The HDMI system comprises a media channel, an HDMI source device and at least two HDMI sink devices. The HDMI source device comprises a communication module and a DDC controller. The communication module connects to the HDMI sink devices directly via the media channel for transmission of media contents. The DDC controller is used to process Extended Display Interface Data (EDID) of the HDMI sink devices. In an embodiment, the DDC controller determines a media format commonly supported by the HDMI sink devices based on the EDID of the HDMI sink devices, and the communication module uses the media format to provide the media contents.

22 Claims, 4 Drawing Sheets

SYSTEM, METHOD AND DEVICES FOR HDMI TRANSMISSION USING A COMMONLY SUPPORTED MEDIA FORMAT

BACKGROUND OF THE INVENTION

1. Field of the Invention

The invention relates to High Definition Multimedia Interface (HDMI), and in particular, to an HDMI source device simultaneously providing media contents to multiple HDMI sink devices without additional repeaters.

2. Description of the Related Art

High-Definition Multimedia Interface (HDMI) is a licensable audio/video connector interface for transmitting uncompressed, encrypted digital streams. Video and Audio data provided by various DRM-enforcing digital audio/video source devices, such as a set-top box, a HD DVD Disc player, a Blu-ray Disc player, a Personal Computer, a video game console or an AV receiver, can be transmitted to compatible HDMI sink devices such as a digital television (DTV) via the HDMI digital interface. The HDMI standard is initially introduced in 2006 on consumer HDTV camcorders and high-end digital still cameras, representing the DRM (Digital rights management) alternative to consumer analog standards such as RF (coaxial cable), composite video, S-Video, SCART, component video and VGA, and digital standards such as DVI (DVI-D and DVI-I).

FIG. 1 shows a conventional HDMI system architecture. An HDMI source device 110 is coupled to an HDMI sink device 120 via an HDMI digital interface 130. According to the standard, HDMI digital interface 130 generally comprises a plurality of Transition Minimized Differential Signaling (TMDS) channels, a Display Data Channel (DDC) and a Customer Electronic Control (CEC) line. The TMDS channels are used to transmit media contents such as uncompressed video and audio data. In the HDMI source device 110, a transmitter 104 is used to convert the video and audio data into transition minimized differential signals #TMDS, which is then transmitted through the TMDS channels to a receiver 122 of the HDMI sink device 120. The HDMI sink device 120 comprises an EDID ROM 126 for storage of identification information such as a list of supported display resolutions and a device unique private key. If High-Bandwidth Digital Content Protection (HDCP) standard is implemented in the system shown in FIG. 1, authentication is required before the HDMI source device 110 transmits the copy-protection media content to the HDMI sink device 120. When the HDMI sink device 120 is attached to the HDMI source device 110, the identification information stored in the EDID ROM 126 is acquired and examined by a DDC controller 106 of the HDMI source device 110 with extended display interface data #DDC. If the HDMI sink device 120 is authenticated, a computed shared key related stream is generated and used by a HDCP module 102 of the HDMI source device 110 to encrypt a media content media content #M. Based on the shared key, the HDCP module 102 can encrypt the media content #M into a protected media content #E which is then converted into the transition minimized differential signals #TMDS by the transmitter 104. Symmetrically, the receiver 122 in the HDMI sink device 120 receives the transition minimized differential signals #TMDS from the transmitter 104 to reacquire the protected media content #E, which is then decrypted in a HDCP module 124 thereof to replay the media content #M. In the HDMI source device 110, the CEO control unit 108 of the HDMI source 110 can issue or receive remote control signals #CEC to trigger corresponding device functions, and so is the CEO control unit 128 of the HDMI sink device 120.

Detailed introductions of the described architecture can be found in HDMI specification documents, and the point to be emphasized is, the HDMI source device 110 and HDMI sink device 120 is a one-on-one architecture. If there are multiple HDMI sink devices 120 requiring the same media content #M, additional hardware such as repeaters are needed. FIG. 2 shows a conventional HDMI system architecture using a repeater 200. The repeater 200 is also defined by the HDMI standard, based on which one HDMI source device 110 can provide media contents to two HDMI sink devices 210 and 220. Initially, when HDCP standard is implemented in the system shown in FIG. 2 and the repeater 200 is attached to the HDMI source device 110 through the HDMI interface, the repeater 200 is authenticated by the HDMI source device 110, and a shared key is generated as a basis for transmissions between the HDMI source device 110 and repeater 200. When the HDMI sink devices 210 and 220 are attached to the repeater 200, similarly, they are authenticated by the repeater 200, and corresponding shared keys are generated to handle the transmissions therebetween. The HDMI source device 110 accordingly authenticates the repeater 200 and HDMI sink devices 210 and 220 with the shared keys. The HDMI sink devices 210 and 220 may support different resolutions, and the HDMI source device 110 can set the best fit media content #TMDS to the HDMI sink devices 210 and 220 based on corresponding identification information #EDID1 and #EDID2 received from the HDMI sink devices 210 and 220 respectively through HDMI repeater 200.

BRIEF SUMMARY OF THE INVENTION

An exemplary embodiment of a High Definition Multimedia Interface (HDMI) system is provided. The HDMI system comprises at least one media channel, an HDMI source device and at least two HDMI sink devices. The HDMI source device comprises a first communication module and a DDC controller. The first communication module connects to the HDMI sink devices directly via the media channel for transmission of media contents. The DDC controller is used to process Extended Display Identification Data (EDID) of the HDMI sink devices. In an embodiment, the DDC controller determines a media format commonly supported by the HDMI sink devices based on the EDID of the HDMI sink devices, and the first communication module uses the media format to provide the media contents.

The HDMI source device may communicate with the HDMI sink devices without intervention of a repeater. As an example, the media format regulates video resolution or audio quality of the media contents. Each of the HDMI sink devices comprises a second communication module and an EDID ROM. The second communication module is coupled to the media channel for reception of the media contents, and the EDID ROM is coupled to the second communication module for provision of the EDID.

The HDMI source device is also claimed. In an alternative embodiment, the HDMI source device comprises a communication module connectable to at least two HDMI sink devices directly via a media channel for transmission of media contents. A Display Data Channel (DDC) controller processes Extended Display Identification Data (EDID) of the HDMI sink devices.

A media content provision method implemented in the HDMI source device is also provided. Firstly, a media channel is established, directly connecting the HDMI source device to at least two HDMI sink devices for transmission of media contents. Secondly, the EDID of the HDMI sink devices are read through the media channel when High-Bandwidth Digital Content Protection (HDCP) standard is required. Thereafter, the media format which is commonly supported by the HDMI sink devices is detected based on the EDID of the HDMI sink devices. The media format is then used to transmit the media contents. A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

The invention proposes a one-to-many system architecture which is presently undefined in the HDMI specification. A pair of communication modules are provided to replace the transmitter 104 in the HDMI source device 110 and the receiver 122 in the HDMI sink device 120, such that the transition minimized differential signals #TMDS, extended display interface data #DDC and remote control signals #CEC are modulated into a transmission signal #MTKI whereby a repeater is not required when multiple HDMI sink devices are presented.

Figure 1:
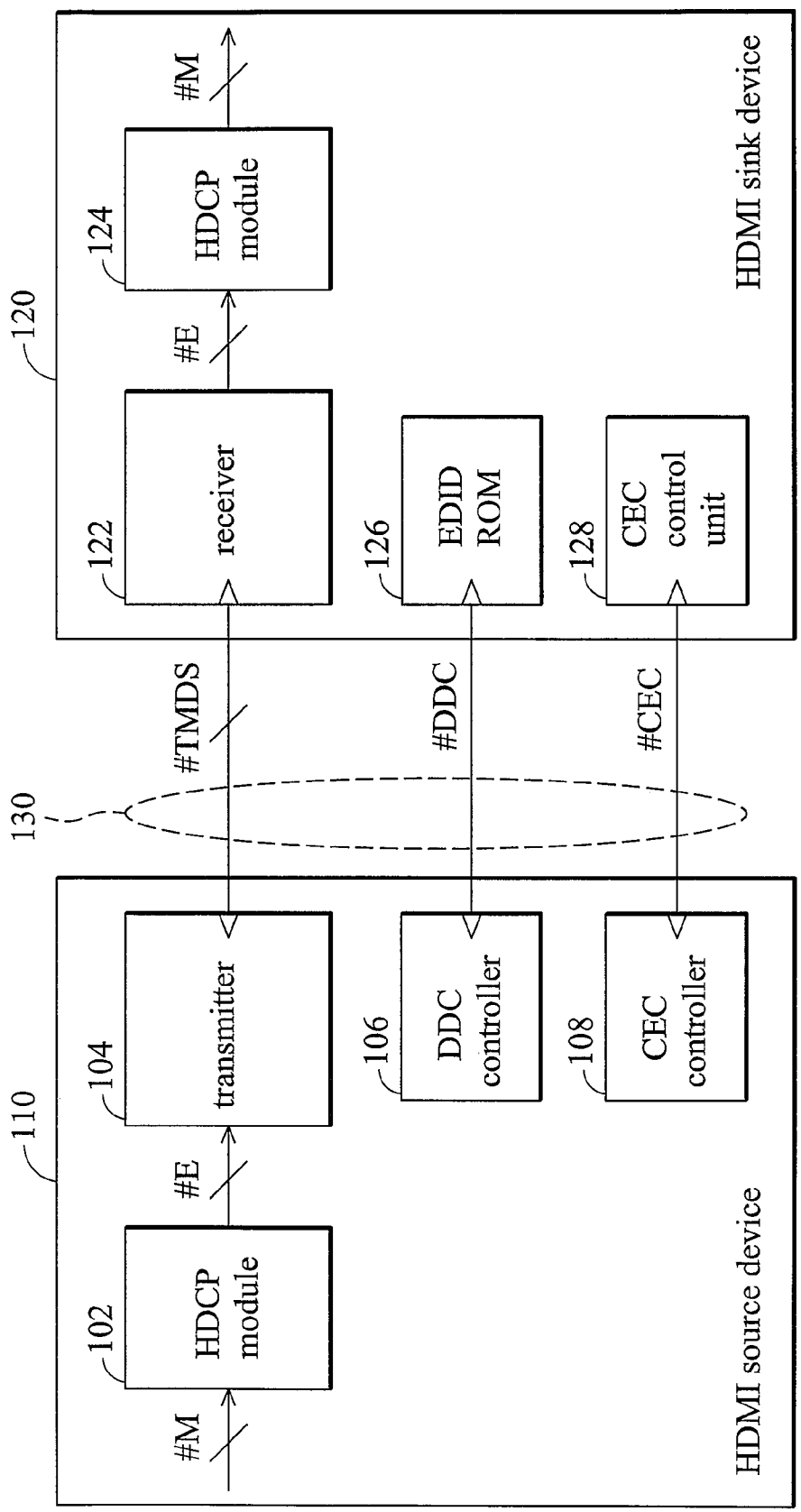
FIG. 1 shows a conventional HDMI system architecture.
Figure 2:
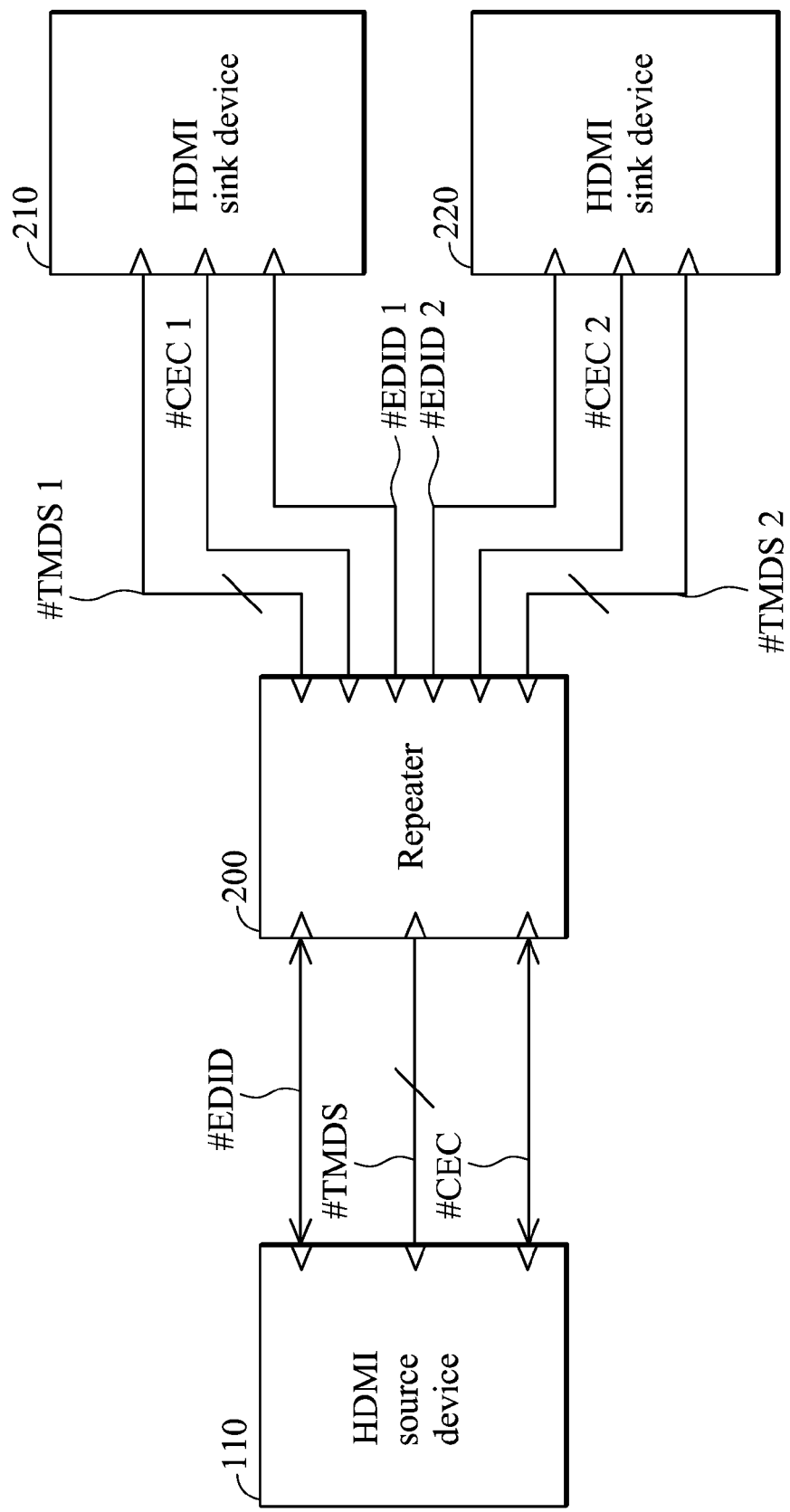
FIG. 2 shows a conventional HDMI system architecture using a repeater.
Figure 3:
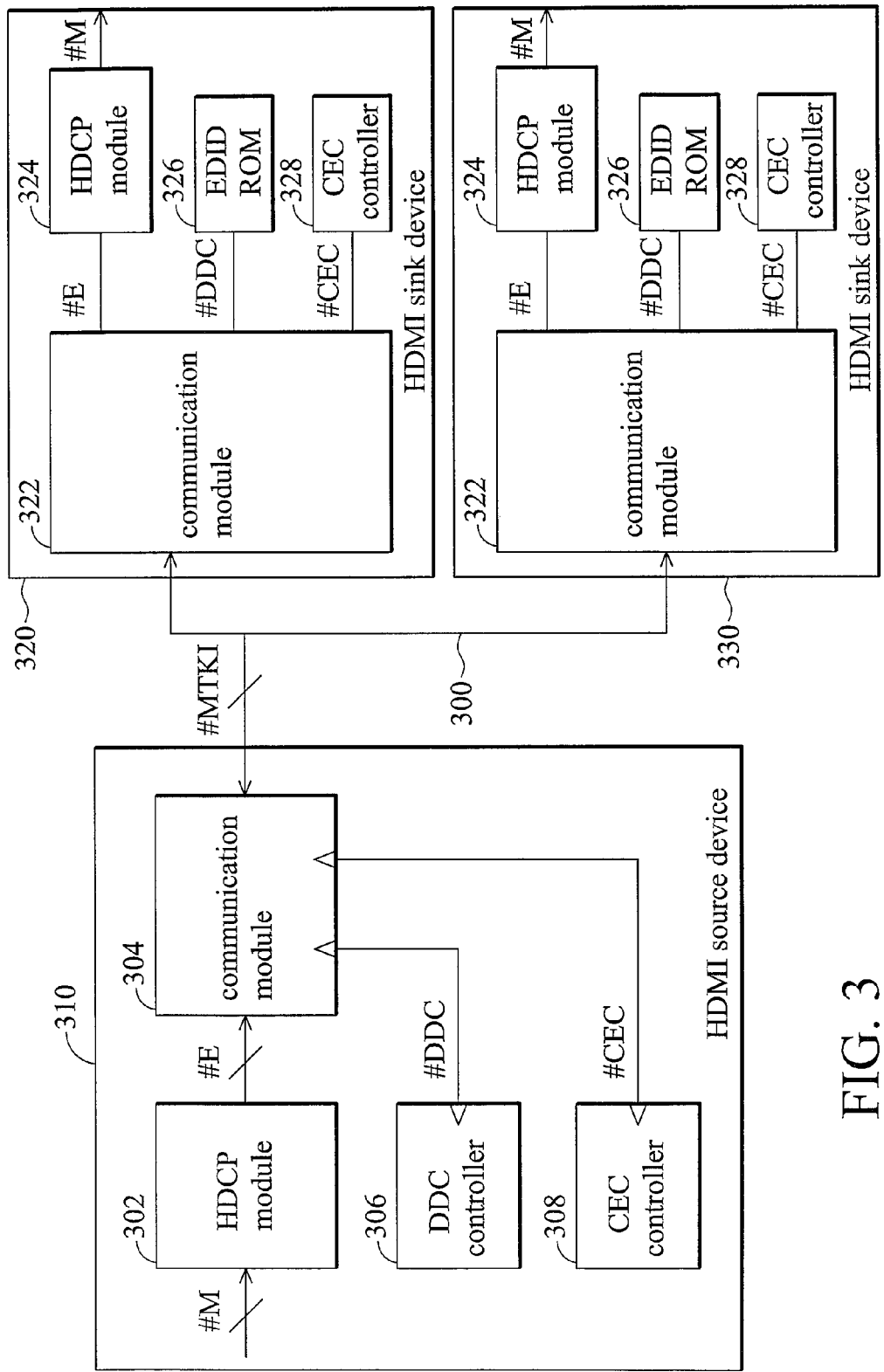
FIG. 3 shows an embodiment of an HDMI system architecture.

FIG. 3 shows an embodiment of an HDMI system architecture. An HDMI source device 310 is coupled to two HDMI sink devices 320 and 330 directly via a media channel 300. The HDMI source device 310 comprises a communication module 304 coupled to a HDCP module 302, a DDC controller 306 and a CEC controller 308. The DDC controller 306 provides extended display interface data #DDC to the communication module 304, the CEC controller 308 issues or receives remote control signals #CEC to the communication module 304, and the HDCP module 302 encrypts a media content #M into a protected media content #E and provides the protected media content #E to the communication module 304 when HDCP standard is implemented in the system shown in FIG. 3. The communication module 304 modulates the protected media content #E, extended display interface data #DDC and remote control signals #CEC into a transmission signal #MTKI of particular form so that transmissions to multiple HDMI sink devices 320 and 330 are made possible. The HDMI sink devices 320 and 330 may individually support a variety of different resolutions, but the HDMI source device 310 outputs the transmission signal #MTKI of only one resolution. Therefore, to ensure the transmission signal #MTKI is supported by both the HDMI sink devices 320 and 330, the DDC controller 306 reads the EDID ROMs 326 in the HDMI sink devices 320 and 330 to determine an optimal resolution which is simultaneously supported by the HDMI sink devices 320 and 330. Accordingly, the HDMI source device 310 uses the optimal resolution to provide the transmission signal #MTKI. Likewise, audio quality supported by the HDMI sink devices 320 and 330 may also be configured in this way.

In the HDMI sink devices 320 or 330, a communication module 322 is implemented to receive and demodulate the transmission signal #MTKI into ordinary HDMI signals, allowing the HDCP module 324, EDID ROM 326 and remote control unit 328 to operate regularly. For example, transmissions of the extended display interface data #DDC between the DDC controller 306 and EDID ROM 326 are integrated into the transmission signal #MTKI and transferred over the media channel 300. Likewise, transmissions of the remote control signals #CEC between the CEC controller 308 and CEC controller 328 are also integrated into the transmission signal #MTKI and transferred over the media channel 300.

In an embodiment of the invention, the communication module 304 and communication modules 322 may be wireless communication modules, and the media channel 300 is a wireless channel. Thus, the media content #M, extended display interface data #DDC and remote control signals #CEC can be integrated and transmitted thereby. Practically, the media channel 300 may be implemented by the Ultra Wide Band (UWB) standard. The wireless performance is feasible to sustain the bandwidth requirements of the media content #M. For example, a MPEG DVD has a bit rate of 10 Mbps, and a MPEG2 HD format requires 25 Mbps while the UWB standard supports a transfer rate up to 480 Mbps.

Since the HDMI system is modified into a one-to-many based system architecture without any repeater, the authentication handshakes may also need a minor modification to be in compliance with the HDCP standard when HDCP standard is implemented. In one embodiment, the DDC controller 306 individually authenticates the HDMI sink devices 320 and 330 based on the EDID stored in the two EDID ROMs 326. Thereafter, a shared key is generated and shared by the HDMI source device 310 and HDMI sink devices 320 and 330. Based on the shared key, the HDCP module 302 encrypts the media content #M into a protected media content #E. The protected media content #E is then modulated into the transmission signal #MTKI by the communication module 304 and transmitted to the HDMI sink devices 320 and 330. In the HDMI sink devices 320 or 330, the communication module 322 demodulates the transmission signal #MTKI to reacquire the protected media content #E, and the HDCP module 324 uses the same shared key to decrypt the protected media content #E into the media content #M. Thereby, implementing the HDCP standard.

Figure 4:
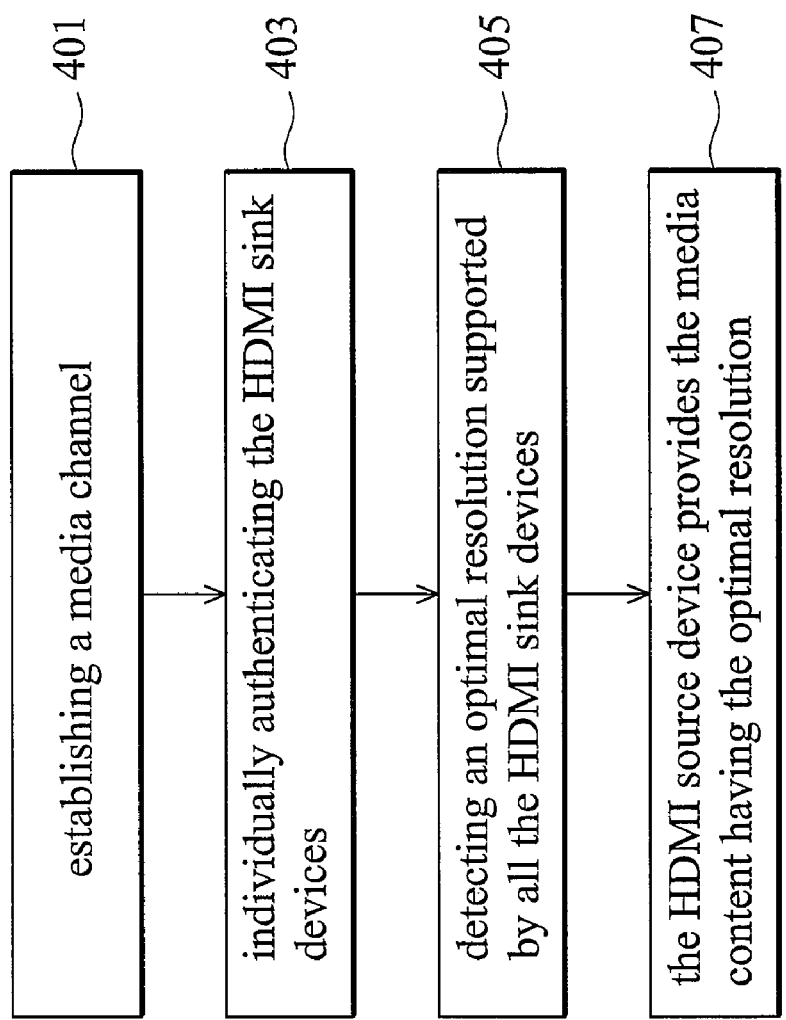
FIG. 4 is a flowchart of a media content provision method according to the invention.

FIG. 4 is a flowchart of a media content provision method according to the invention. Based on HDMI system architecture shown in FIG. 3, a media content provision method is described. In step 401, a media channel is established, connecting the HDMI source device directly to at least two HDMI sink devices for transmission of media contents. In step 403, the Extended Display Identification Data (EDID) stored in the EDID ROMs 326 is read by the DDC controller 306 via the media channel, thereby the HDMI sink devices 320 and 330 are individually authenticated. In step 405, resolution information stored in the EDID ROMs 326 are read by the DDC controller 306, thereby determining an optimal resolution supported by all the HDMI sink devices 320 and 330. Accordingly, the HDMI source device 310 provides the media content #M having the optimal resolution in step 407, such that the media content #M can be normally replayed on the HDMI sink devices 320 and 330. The HDMI sink devices 320 and 330 may support variable types of media contents, and other parameters such as audio quality of the media content #M may also be adjusted in the same way to fit both the HDMI sink devices 320 and 330.

The HDCP may not be required in the one-to-many system architecture, so the media content #M may be directly provided to the communication module 304 for modulation once resolution information is obtained in step 405 with omitting step 403, and consequently the communication module 322 in either the HDMI sink devices 320 or 330 may obtain the media content #M directly from the transmission signal #MTKI. There may be other HDMI features deployable in the proposed system architecture, and the invention is not limited thereto. The communication modules 304 and 322 described in the embodiment are wireless modules; however, the HDMI system may be implemented by other wired solutions. Whatever solution is used, there is no repeater required between the HDMI source device 310 and HDMI sink devices 320 and 330. The HDMI source device 310 may be applicable in various DRM-enforcing digital audio/video source devices, such as a set-top box, an HD DVD Disc player, a Blu-ray Disc player, a Personal Computer, a video game console or an AV receiver, and the HDMI sink devices 320 or 330 may be a digital television (DTV), a projector or a LCD display.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A High Definition Multimedia Interface (HDMI) source device, comprising:
   a communication module, directly connectable to at least two HDMI sink devices directly via a media channel for transmission of media contents; and
   a Display Data Channel (DDC) controller, coupled to the communication module for processing Extended Display Identification Data (EDID) of the HDMI sink devices, wherein
   the DDC controller determines a media format commonly supported by all the HDMI sink devices based on the EDID of the HDMI sink devices, and
   the communication module uses the commonly supported media format to provide the media contents;
   wherein the communication module receives content output from a content module, and output data from the DDC controller, and the communication module utilizes content and the output data to generate output data that is communicated over the media channel, and wherein the HDMI source device communicates with the HDMI sink devices directly via the media channel without a repeater.

2. The HDMI source device as claimed in claim 1, wherein the media format regulates video resolution or audio quality of the media contents.

3. The HDMI source device as claimed in claim 1, further comprising a remote controller, coupled to the communication module for processing remote control signals for the HDMI source device and the HDMI sink devices.

4. The HDMI source device as claimed in claim 3, wherein the communication module is a wireless communication module, whereby the media contents, EDID and remote control signals are integrated and transmitted over the media channel.

5. The HDMI source device as claimed in claim 4, wherein the media channel is compliant to Ultra Wide Band (UWB) standard.

6. The HDMI source device as claimed in claim 1, wherein the DDC controller authenticates the HDMI sink devices based on their EDID before transmitting the media contents thereto, thereby generating a shared key, when High-Bandwidth Digital Content Protection (HDCP) standard is required.

7. The HDMI source device as claimed in claim 6, further comprising a High-Bandwidth Digital Content Protection (HDCP) module, encrypting the media content using the shared key before the communication module transmits the media contents to the HDMI sink devices.

8. A media content provision method adaptable in a High Definition Multimedia Interface (HDMI) source device, comprising:
   establishing a media channel connecting the HDMI source device directly to at least two HDMI sink devices for transmission of media contents;
   reading Extended Display Identification Data (EDID) from the HDMI sink devices through the media channel;
   determining a media format commonly supported by the HDMI sink devices based on the EDID of the HDMI sink devices; and
   transmitting the media contents with the commonly supported media format to the HDMI sink devices;
   wherein the transmission of the media contents further comprises transmitting the media contents with the media format to two HDMI sink devices without intervention of a repeater.

9. The media content provision method as claimed in claim 8, wherein the media format regulates video resolution or audio quality of the media contents.

10. The media content provision method as claimed in claim 8, further comprising processing remote control signals for the HDMI source device and the HDMI sink devices.

11. The media content provision method as claimed in claim 10, wherein the media channel is wireless, and the media contents, EDID and remote control signals are integrated and transmitted over the media channel.

12. The media content provision method as claimed in claim 11, wherein the media channel is compliant to Ultra Wide Band (UWB) standard.

13. The media content provision method as claimed in claim 8, further comprising:
   authenticating the HDMI sink devices based on their EDID before transmitting the media contents; and
   generating a shared key when the HDMI sink devices are authenticated.

14. The media content provision method as claimed in claim 13, further comprising encrypting the media contents using the shared key before transmitting the media contents to the HDMI sink devices.

15. A High Definition Multimedia Interface (HDMI) system, comprising:
   at least one media channel;
   at least two HDMI sink devices coupled to the media channel; and
   an HDMI source device connected to the HDMI sink devices directly via the media channel, wherein,
   the HDMI source device comprises:
   a first communication module, coupled to the media channel for transmission of media contents, and
   a DDC controller, coupled to the first communication module for processing Extended Display Identification Data (EDID) of the HDMI sink devices;

the DDC controller determines a media format commonly supported by the HDMI sink devices based on the EDID of the HDMI sink devices; and the first communication module provides the media contents with the commonly supported media format;

wherein the first communication module receives content output from a content module, and output data from the DDC controller, and the first communication module utilizes content and the output data to generate output data that is communicated over the media channel; and wherein the HDMI source device communicates with the HDMI sink devices without intervention of a repeater.

16. The HDMI system as claimed in claim 15, wherein the media format regulates video resolution or audio quality of the media contents.

17. The HDMI system as claimed in claim 15, wherein each of the HDMI sink devices comprises:

a second communication module, coupled to the media channel for reception of the media contents; and an EDID ROM, coupled to the second communication module for provision of the EDID;

performing corresponding CEC related actions in response to remote control signals.

18. The HDMI system as claimed in claim 17, wherein the first and second communication modules are wireless communication modules, whereby the media contents and EDID are integrated and transmitted over the media channel.

19. The HDMI system as claimed in claim 18, wherein the media channel is compliant to Ultra Wide Band (UWB) standard.

20. The HDMI system as claimed in claim 15, wherein the DDC controller authenticates the HDMI sink devices based on their EDID before transmitting the media contents thereto, and a shared key is generated after the HDMI sink devices are authenticated.

21. The HDMI system as claimed in claim 20, wherein the HDMI source device further comprises a first HDCP module, encrypting the media content using the shared key before the first communication module transmitting the media contents to the HDMI sink devices.

22. The HDMI system as claimed in claim 21, wherein each of the HDMI sink devices further comprises a second HDCP module, decrypting the media content using the shared key after receiving the media contents from the first communication module.

* * * * *